United States Patent [19]

Joseph, Jr. II

[11] 4,272,209
[45] Jun. 9, 1981

[54] ANTI-VANDALISM NUT ASSEMBLY

[75] Inventor: Daniel Joseph, Jr. II, Ojo Caliente, N. Mex.

[73] Assignee: Roland C. Zinn, Tesuque, N. Mex.

[21] Appl. No.: 880,216

[22] Filed: Feb. 22, 1978

[51] Int. Cl.³ .......................................... F16B 33/00
[52] U.S. Cl. ..................... 403/408; 29/240; 29/426.5; 29/526 R; 411/222; 411/427; 411/910
[58] Field of Search ................. 29/427, 428, 283, 240, 29/526, 426.5; 151/15; 403/22, 408; 85/1 R, 32 R, 32 UN, 45

[56] References Cited

U.S. PATENT DOCUMENTS

| 218,275 | 8/1879 | Jones | 85/45 UX |
|---|---|---|---|
| 976,569 | 11/1910 | Horrocks | 85/1 R |
| 1,120,368 | 12/1914 | Boaraem et al. | 85/1 R UX |
| 1,677,269 | 7/1928 | Booraem et al. | 85/32 R UX |
| 1,950,340 | 3/1934 | Ferguson et al. | 85/32 R |
| 2,069,500 | 2/1937 | McGarry | 85/1 R X |
| 2,439,415 | 4/1948 | Bloomfield | 151/15 |
| 3,674,075 | 7/1972 | Haegee | 85/32 R X |
| 3,890,697 | 6/1975 | Horioka | 403/408 X |
| 3,925,876 | 12/1975 | Curtis | 29/526 X |
| 3,947,945 | 4/1976 | Gulistan | 29/427 X |

OTHER PUBLICATIONS

Better Roads, Published Oct. 1976.

Primary Examiner—Charlie T. Moon
Attorney, Agent, or Firm—Andrus, Sceales, Starke & Sawall

[57] ABSTRACT

An anti-vandalism nut assembly joins two or more structures and includes a threaded bolt and a specially designed nut which is assembled through the use of another threaded element. Two nuts are each formed with a rectangular or square base and four sloping sides providing a pyramid-like construction extending upwardly from the base. The inner securing nut cannot be rotated by conventional tools when seated tightly in place because of the sloping construction. In assembly or dis-assembly, the outer nut is threaded on the bolt and spaced from the inner nut so that a conventional tool may be wedged between the two nuts for gripping both nuts securely for selective rotation.

1 Claim, 9 Drawing Figures

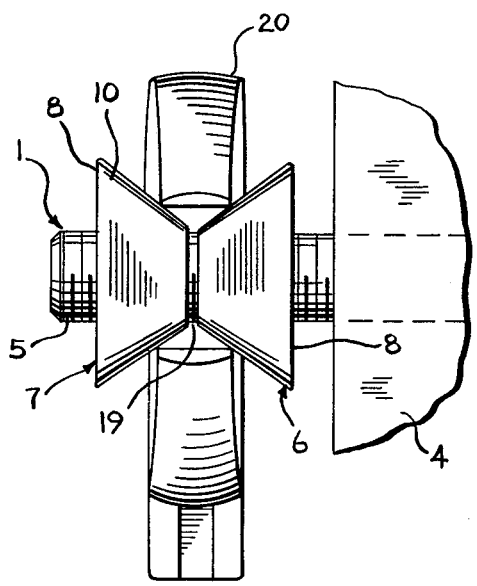
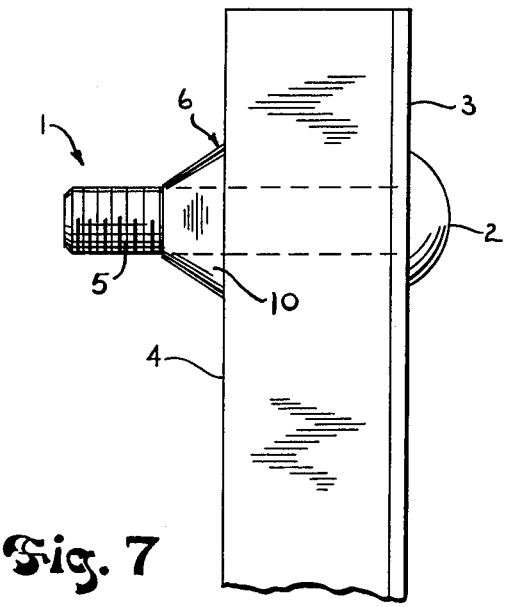
Fig. 6
Fig. 7
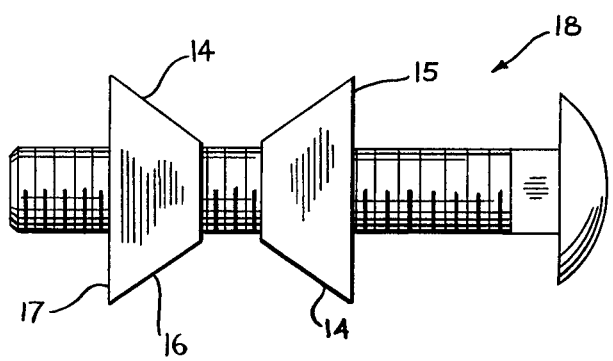
Fig. 8
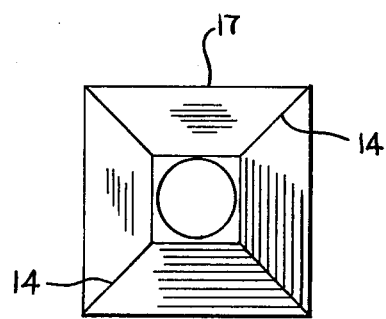
Fig. 9

ANTI-VANDALISM NUT ASSEMBLY

BACKGROUND OF THE INVENTION

The vandalism problem in public places such as in national and state parks has become rampant throughout the country for a number of years with the result that many signs providing information to the public are often removed or destroyed. The nut and bolt assembly of the present invention differs from other anti-vandalism constructions in that no special tool is required for fastening or removing a securing nut.

SUMMARY OF THE INVENTION

The anti-vandalism nut assembly is directed to a threaded bolt and a securing nut and an outer auxiliary member utilized with a conventional tool to properly position the securing nut.

The nut of the invention is specially designed so that it cannot be independently rotated with a conventional tool. In operation, the specially designed securing nut is rotated on the bolt with fingers or the like to provide a loose fit of the nut against the wood or metal surfaces to which another structure is to be secured. Thereafter, an auxiliary member is threaded onto the bolt so that the specially designed portions of the nut and the outer surface portions of the auxiliary member are adjacent to each other. A conventional tool engages the outer surfaces of the securing nut and the auxiliary member thereby allowing both to be turned to securely fasten the bolt and securing nut. Thereafter the auxiliary member is removed leaving the securing nut seated in place with the specially designed outer surface preventing gripping and rotation by a conventional tool.

Several embodiments of the invention are described and the specially designed nuts may take various forms. In a preferred embodiment, both the securing nut and the auxiliary member are identically formed and mounted with opposite orientations on the threaded bolt so that the specially designed sloping surfaces face each other. Such sloping surfaces may take a pyramid-like form so that a tool will slip off the outer surfaces of the nuts unless they are assembled together in slightly spaced relation with their pyramid-like surfaces then disposed to be gripped by a conventional tool wedged between the nuts.

BRIEF DESCRIPTION OF THE DRAWINGS

FIG. 6 is a side elevational view of the assembly of FIG. 1 and the employment of a conventional tool between the nuts to rotate the inner nut with the aid of the outer nut for rotating the inner nut into a seated position;

FIG. 7 is a side elevational view of a portion of the assembly of FIG. 6 and illustrating the inner nut secured in the final fastening position;

FIG. 8 illustrates in side elevation of another embodiment of the invention in which the corner abutments of the pyramid-like nut are sharper than those in the embodiment illustrated in FIGS. 1-7; and FIG. 9 is a top plan view of one of the nuts illustrated in FIG. 8.

DESCRIPTION OF THE DRAWINGS

Figure 1:
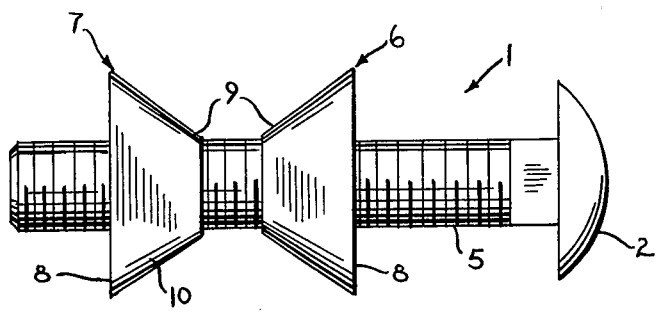
FIG. 1 is a side elevation of the nut and bolt assembly of the invention of the preferred embodiment of the invention with the nuts spaced from each other.
Figure 2:
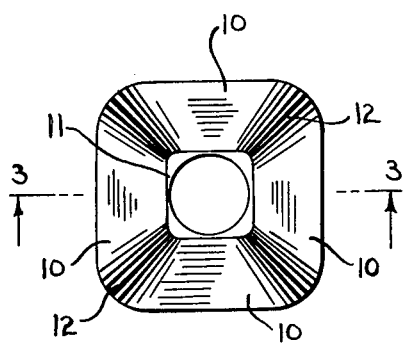
FIG. 2 is a top plan view of one of the nuts shown in FIG. 1.
Figure 3:
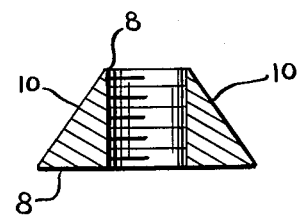
FIG. 3 is a section taken on line 3—3 of FIG. 2.

Referring to the first embodiment of the invention illustrated in FIGS. 1-7, there is shown a bolt 1 having a head 2 which in place seats against the sign 3 or the like and projects through sign 3 end the support 4 to which sign 3, as illustrated in FIG. 7, is secured.

Bolt 1 carries threads 5 which receive an inner fastener nut 6 and an outer nut 7.

As shown in FIGS. 1-7, the base 8 of nuts 6 and 7 are square but could be of rectangular or other configuration. The facing surfaces 9 of nuts 6 and 7 are illustrated as being of the same configuration but this is not always the case because the only requirement is that the inner nut 7 has a specially designed surface which prevents nut 7 from being independently gripped by a conventional tool and rotated. The outer nut 6 normally has abutments of some type which are also gripped by the conventional tool.

The facing surfaces 9 of nuts 6 and 7 have four sides 10 which gradually slope from the apex 11 to the base 8 respectively, to form a pyramid-like configuration with sides 10 sloping approximately 40°–45°.

Figure 4:
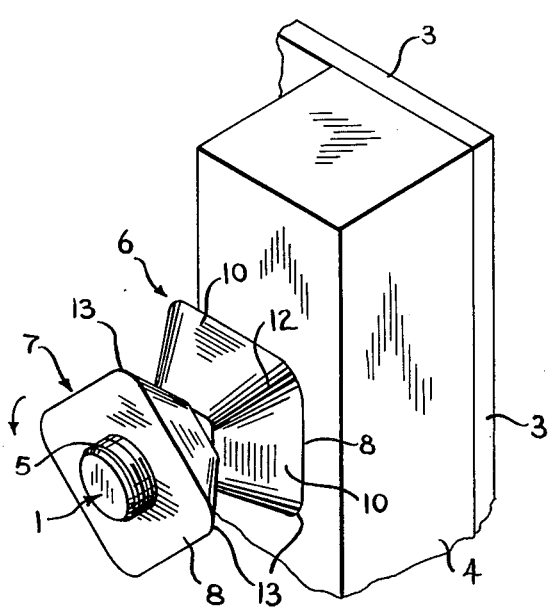
FIG. 4 is a perspective view of the assembly of FIG. 1 with the inner nut loosely engaging the structure to be secured in place and with the outer nut snuggly engaging in the inner nut.

In the embodiment illustrated in FIGS. 1-7, the corners 12 between the four sloping sides 10 of the nuts 6 and 7 have been smoothed down so that they are not sharp, as illustrated by the shading in the drawings. This also results in the somewhat rounded surfaces 13 around base 8 of nuts 6 and 7 as illustrated in FIG. 4.

In the second embodiment of the invention illustrated in FIGS. 8 and 9, the only difference from the first embodiment is that the corners 14 of the inner nut 15 and outer nut 16 have a sharp configuration. The base 17 of the nuts is shown as square. The bolt 18 is as described with respect to the first embodiment.

Figure 5:
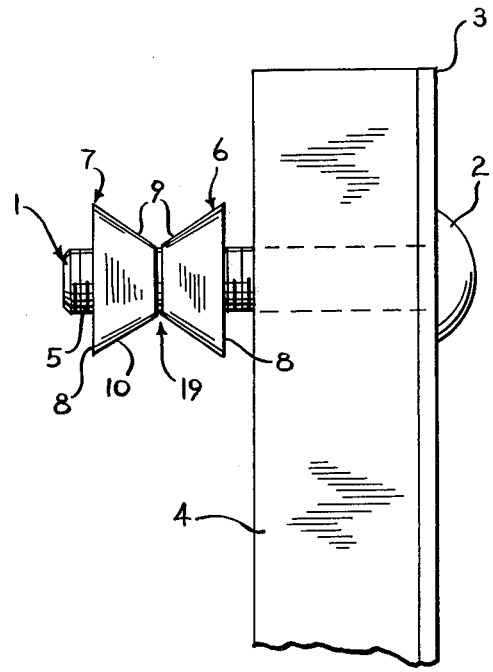
FIG. 5 is a side elevational view of the assembly of FIG. 1 and illustrating the outer nuts spaced closely to the inner nut with alignment between the sloping outer surfaces.

The method of the installation of the inner nuts in both embodiments is the same so that the method will be described with respect to the first embodiment only with particular reference to FIGS. 4-6.

In assembly, bolt 1 is initially inserted through sign 3 until head 2 seats against the surface of sign 3 with the part of bolt 1 carrying threads 5 through the support 4 and projecting therefrom.

Inner or fastener nut 6 is then rotated upon bolt 2 with the fingers or the like until there is a loose fit of the base 8 of nut 6 against the wood or metal support 4 to which sign 3 is being secured.

Thereafter the outer nut 7 is threaded onto bolt 1 so that the apexes 1 of nuts 6 and 7 are engaged. Next the outer nut 7 is backed off slightly from inner nut 6 as illustrated in FIG. 4 to provide the space 19 between the nuts as shown in FIG. 5.

Conventional tools 20 such as wrenches including plyers, vice-grips or the like are then disposed or wedged into the area between the nuts 6 and 7 as shown in FIG. 6 so that both nuts are engaged to normally rotate the nuts 6 and 7 to thereby turn nuts 6 and 7 and seat inner nut 6 securely against support 4 as illustrated in FIG. 7. The outer nut 7 in effect provides an implement or device which co-operates with the tool 28 to rotate the inner nut. Thereafter outer nut 7 is removed and the specially designed surface of inner fastner nut 6 then makes it unremovable independently by a conventional tool. The sloping surface of nut 6 prevents gripping by a tool because the tool slides off from the sides of nut 6. The inner nut 6 may be removed, if necessary, by again operating the outer nut 7 and tool 18 as described except reversing their rotation.

The use of an auxiliary member such as nut 7 with a similar sloping surface 10 as provided by nut 6 permits a highly desirable wedging sequence with the tool 20. In such manner, the tool 20 impacts both radial and axial forces upon the inner unit 6 to provide an optimum rotative gripping operation.

The anti-vandalism nut assembly has been found to be extremely useful to secure signs and other items in a public place where theft has become a problem.

If the nuts of the invention are formed with the same configuration they become readily interchangeable which has the advantage of only maintaining the inventory of the specially designed nuts.

Various modes of carrying out the invention are contemplated as being within the scope of the following claims, particularly pointing out and distinctly claiming the subject matter which is regarded as the invention.

I claim:

1. A bolt and nut assembly to secure a structure member such as a sign or the like to a support member to prevent removal by vandals, comprising a bolt having head means engaging one of the members and a threaded shaft extending through the other member and projecting outwardly therefrom, an inner nut threaded onto the shaft and disposed to be seated in engagement with the structure to secure the latter in place, the inner nut having an outer facing surface of a generally pyramid-like configuration normally non-gripping by a conventional tool to rotate the inner nut into or out of seated position with respect to the members, a second nut threaded onto the shaft outwardly of the inner nut and acting as in implements in combination with a conventional tool actuated between the inner and outer nut in engagement with both nuts when slightly spaced apart to rotate the inner nut into a seated position or to remove the inner nut from the seated position, and the outer nut being removable from the shaft of the bolt when not in use.

* * * * *

UNITED STATES PATENT AND TRADEMARK OFFICE
CERTIFICATE OF CORRECTION

PATENT NO. : 4,272,209

DATED : June 9, 1981

INVENTOR(S) : DANIEL JOSEPH, JR. II

It is certified that error appears in the above-identified patent and that said Letters Patent are hereby corrected as shown below:

Column 2, Line 15    cancel "end" and substitute therefor ---and---

Column 3, Line 3    cancel "fastner" and substitute therefor ---fastener---

Signed and Sealed this

Thirteenth Day of October 1981

[SEAL]

Attest:

GERALD J. MOSSINGHOFF

*Attesting Officer*      *Commissioner of Patents and Trademarks*